United States Patent
Rublee et al.

(10) Patent No.: US 9,457,477 B1
(45) Date of Patent: Oct. 4, 2016

(54) VARIABLE STIFFNESS SUCTION GRIPPER

(71) Applicant: Google Inc., Mountain View, CA (US)

(72) Inventors: Ethan Rublee, Mountain View, CA (US); John Zevenbergen, San Francisco, CA (US); Kurt Konolige, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 113 days.

(21) Appl. No.: 14/584,070

(22) Filed: Dec. 29, 2014

Related U.S. Application Data

(60) Provisional application No. 62/041,512, filed on Aug. 25, 2014.

(51) Int. Cl.
*B25J 15/06* (2006.01)
*B25J 11/00* (2006.01)
*B25J 9/16* (2006.01)

(52) U.S. Cl.
CPC .............. *B25J 15/0616* (2013.01); *B25J 9/16* (2013.01); *B25J 11/00* (2013.01); *B25J 15/06* (2013.01); *Y10S 901/02* (2013.01); *Y10S 901/40* (2013.01)

(58) Field of Classification Search
CPC .... H01L 21/6838; B65G 47/91; B25J 15/06; B25J 15/0616
USPC ................ 294/183, 185, 188, 189; 414/794; 901/40
See application file for complete search history.

(56) References Cited

U.S. PATENT DOCUMENTS

| | | | |
|---|---|---|---|
| 4,674,915 A * | 6/1987 | Shatto, Jr. | B25J 5/00 114/250 |
| 6,846,029 B1 | 1/2005 | Ragner et al. | |
| 8,651,543 B2 * | 2/2014 | Matsuoka | B25J 15/0023 294/119.1 |
| 8,727,410 B2 | 5/2014 | Jones et al. | |
| 2013/0106127 A1 | 5/2013 | Lipson et al. | |

* cited by examiner

*Primary Examiner* — Gerald McClain
*Assistant Examiner* — Ronald Jarrett
(74) *Attorney, Agent, or Firm* — McDonnell Boehnen Hulbert & Berghoff LLP

(57) ABSTRACT

An example suction gripper is disclosed that includes a contacting pillow including a plurality of particles inside a non-rigid membrane that allow the contacting pillow to conform to a shape of an object when the contacting pillow is pressed against the object, a plurality of suction cups arranged on the non-rigid membrane of the contacting pillow, and a vacuum system coupled to the contacting pillow and to the plurality of suction cups. The vacuum system may be configured to apply suction to the object through at least one of the plurality of suction cups that is in contact with the object when the contacting pillow is pressed against the object and increase stiffness of the contacting pillow by removing air between the plurality of particles inside the non-rigid membrane of the contacting pillow.

20 Claims, 9 Drawing Sheets

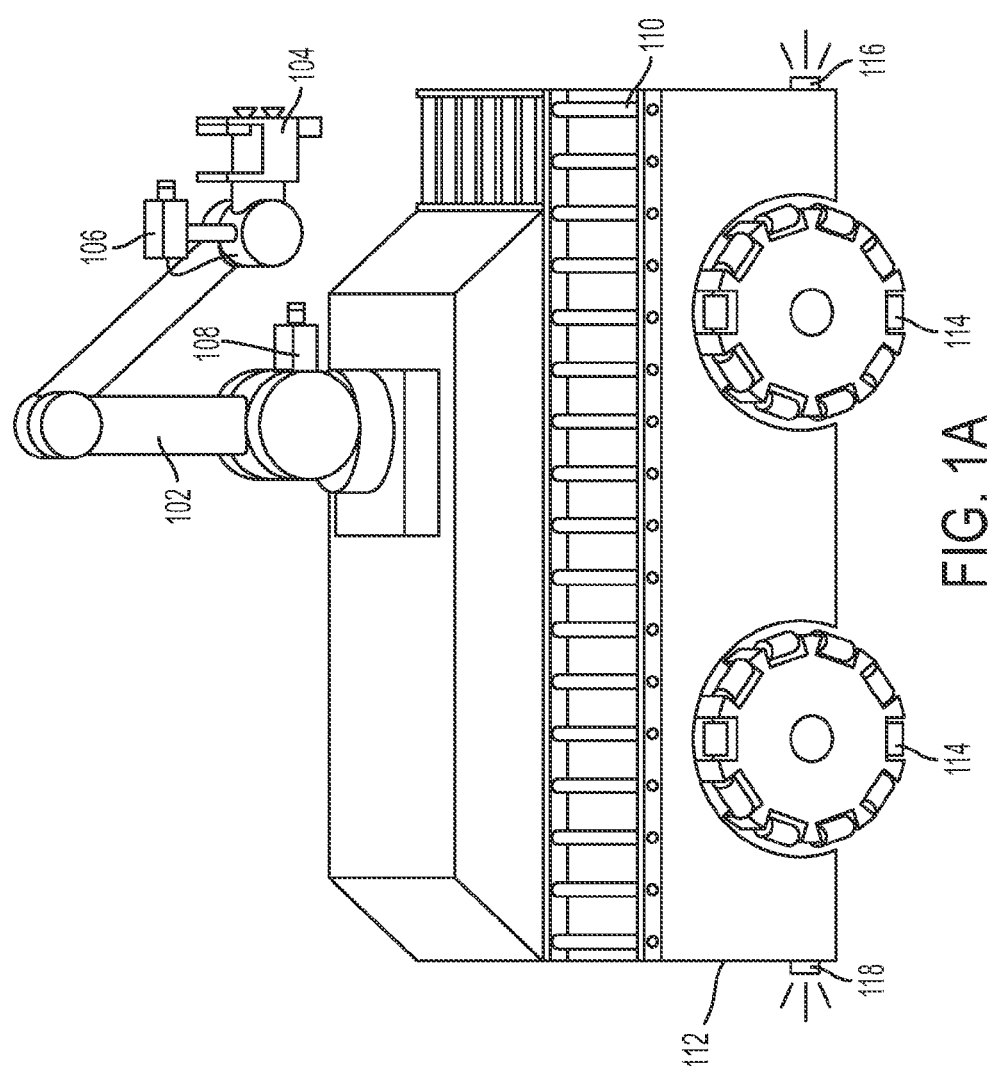

VARIABLE STIFFNESS SUCTION GRIPPER

CROSS REFERENCE TO RELATED APPLICATION

The present application claims priority to U.S. Provisional patent application Ser. No. 62/041,512, filed on Aug. 25, 2014, and entitled "Variable Stiffness Suction Gripper," which is herein incorporated by reference as if fully set forth in this description.

BACKGROUND

Robotic systems, such as a robotic arm containing a gripping component, may be used for applications involving picking up or moving objects. For instance, a robotic device may be used to fill a container with objects, create a stack of objects, or unload objects from a truck bed. In some cases, all of the objects may be of the same type. In other cases, a container or truck may contain a mix of different types of objects, such as boxed items, cans, tires, or other stackable objects. Such robotic systems may direct a robotic arm to pick up objects based on predetermined knowledge of where objects are in the environment.

SUMMARY

The present disclosure includes a gripper with variable stiffness that uses suction to grip an object. An example gripper includes a contacting pillow with a non-rigid membrane that contains a plurality of small particles that allow the pillow to conform to the shape of an object. The gripper may also include one or more suction cups arranged on the contacting pillow. The gripper may further include a vacuum system that is coupled to both the suction cups and the pillow. The vacuum system may be configured to apply suction through one or more of the suction cups (e.g., to grip an object with suction). The vacuum system may also be configured to remove air from between the particles inside the contacting pillow to increase stiffness of the pillow (e.g., to provide stability with increased surface contact between the pillow of the gripper and the object).

In one example, a suction gripper is disclosed that includes a contacting pillow including a plurality of particles inside a non-rigid membrane that allow the contacting pillow to conform to a shape of an object when the contacting pillow is pressed against the object, a plurality of suction cups arranged on the non-rigid membrane of the contacting pillow, and a vacuum system coupled to the contacting pillow and to the plurality of suction cups. The vacuum system may be configured to apply suction to the object through at least one of the plurality of suction cups that is in contact with the object when the contacting pillow is pressed against the object and increase stiffness of the contacting pillow by removing air between the plurality of particles inside the non-rigid membrane of the contacting pillow.

In a further example, a method is provided that includes causing a contacting pillow of a suction gripper to press against an object, where the contacting pillow includes a plurality of particles inside a non-rigid membrane, and where the non-rigid membrane comprises a plurality of suction cups. While the contacting pillow is pressed against the object, the method may further include identifying at least one suction cup from the plurality of suction cups on the non-rigid membrane of the contacting pillow that is in contact with the object. The method may also include causing a vacuum system of the suction gripper to apply suction to the object through the at least one identified suction cup. The method may additionally include causing the vacuum system of the suction gripper to increase stiffness of the contacting pillow by removing air between the plurality of particles inside the non-rigid membrane of the contacting pillow.

In another example, a system is disclosed including a robotic manipulator and a suction gripper coupled to the robotic manipulator. The suction gripper may include a contacting pillow, including a plurality of particles inside a non-rigid membrane. The suction gripper may further include a plurality of suction cups arranged on the non-rigid membrane of the contacting pillow. The suction gripper may additionally include a vacuum system coupled to the contacting pillow and to the plurality of suction cups. The system may further include at least one processor and data storage including instructions executable by the at least one processor to cause the system to perform functions including causing the robotic manipulator to press the contacting pillow of the suction gripper against an object, while the contacting pillow is pressed against the object, identifying at least one of the plurality of suction cups on the non-rigid membrane of the contacting pillow that is in contact with the object, causing the vacuum system of the suction gripper to apply suction to the object through the at least one identified suction cup, and causing the vacuum system of the suction gripper to increase stiffness of the contacting pillow by removing air between the plurality of particles inside the non-rigid membrane of the contacting pillow.

In yet another example, a system may include means for causing a contacting pillow of a suction gripper to press against an object, where the contacting pillow includes a plurality of particles inside a non-rigid membrane, and where the non-rigid membrane comprises a plurality of suction cups. While the contacting pillow is pressed against the object, the system may further include means for identifying at least one suction cup from the plurality of suction cups on the non-rigid membrane of the contacting pillow that is in contact with the object. The system may also include means for causing a vacuum system of the suction gripper to apply suction to the object through the at least one identified suction cup. The system may additionally include means for causing the vacuum system of the suction gripper to increase stiffness of the contacting pillow by removing air between the plurality of particles inside the non-rigid membrane of the contacting pillow.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 1A shows a robotic arm mounted on a moveable cart, according to an example embodiment.

DETAILED DESCRIPTION

Figure 1B:
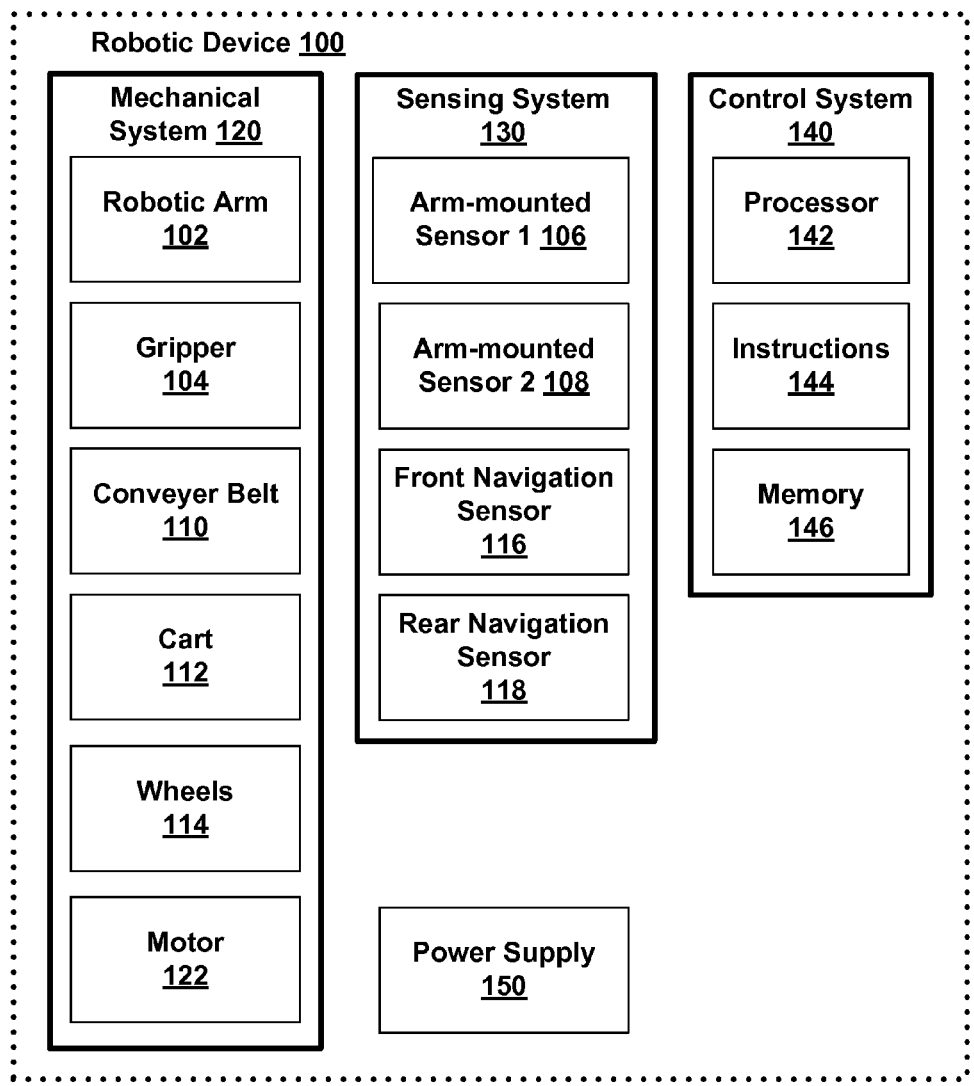
FIG. 1B is a functional block diagram illustrating a robotic device, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Example embodiments may provide for a suction gripper with variable stiffness. A robotic manipulator (e.g., a robotic arm) may be equipped with such a gripper in order to pick up and/or move objects, such as boxes. An example gripper may include a contacting pillow with a non-rigid surface made up of a stretchy material, such as latex or rubber. The contacting pillow may be filled with small particles (e.g., coffee grounds, sand, or glass beads) that allow the contacting pillow to conform to the shape of an object. The gripper may also include a suction vacuum system that can increase the stiffness of the contacting pillow by removing air between the particles inside the contacting pillow. In addition, the surface of the pillow may include one or more suction cups that use suction to engage an object. In some examples, the suction cups may provide the primary holding force for the gripper, while the variable stiffness contacting pillow provides stability for holding or moving an object with the gripper.

In one example, the gripper may initially be set to a non-stiff mode in which the contacting pillow includes enough air between the contained small particles to allow the contacting pillow to conform to an object. The gripper may then be controlled (e.g., by a control system of a robotic arm) to press the pillow against the object, which may cause the pillow to surround one or more surfaces of the object. Additionally, one or more of the suction cups on the surface of the pillow may be pressed against the object. A suction vacuum system may then activate one or more of the suction cups that are contacting the object to apply suction to the object. The suction vacuum system may also allow the gripper to change to a stiff mode removing air between the particles to jam the particles together and increase the stiffness of the pillow.

Within examples, a number of different control algorithms may be used to determine when to increase and/or decrease the stiffness of the contacting pillow. In some examples, the stiffness of the pillow may be increased after a certain level of compression between the pillow and the object has been achieved. In further examples, the stiffness of the pillow may be increased after the pillow is in contact with a certain amount of surface area on the object. In additional examples, the stiffness may be increased after a certain percentage of the non-rigid membrane of the pillow is in contact with the object.

In further examples, the stiffness of the pillow may be increased based on one or more parameters related to the suction cups as well or instead. For instance, the stiffness of the pillow may be increased after a certain predefined number of suction cups have made contact with the object and can be used to grip the object with suction. In additional examples, the stiffness of the pillow may be increased after one or more suction cups of the suction gripper have been activated and have achieved a certain amount of gripping force on the object. In further examples, a threshold gripping force used to cause the gripper to make the jamming surface rigid may be determined based on prior information about the gripper's capabilities (e.g., to achieve a sufficient gripping force to move the object without dropping the object).

In some examples, one or more of the suction cups may be activated to apply suction to the object before the contacting pillow is made rigid. In further examples, the gripper may include a vacuum system that applies suction to the object through one or more of the suction cups and also simultaneously increases the stiffness of the contacting pillow. In yet further examples, the contacting pillow may be made rigid before applying suction to an object through one or more suction cups as well or instead.

In additional examples, the stiffness of the contacting pillow may be varied depending on how much air the vacuum system takes out. In some examples, the vacuum system may increase the stiffness of the contacting pillow multiple times over a series of stages of increasing stiffness. For instance, the system could increase the stiffness of the pillow to an intermediate level, then apply suction to an object through one or more suction cups, and then increase the stiffness of the pillow again to make the pillow rigid. In further examples, different materials may be used for the non-rigid membrane of the pillow and/or the particles inside the pillow to allow for different levels of stiffness as well.

In other examples, the gripper may include an actuator that allows the contacting pillow to wrap around edges or corners of an object to grip one or more additional surfaces of the object. For instance, the gripper may include a pneumatic rubber actuator with multiple chambers that can be filled with air. The vacuum system may then be used to pump air into the chambers of the rubber actuator to cause the pillow of the gripper to curve around an object. In further examples, different types of actuators may be used to extend the pillow around objects as well or instead. In some examples, the pillow may also include multiple separate prongs to engage different surfaces of an object.

In further examples, the gripper may include a rubber backing behind the contacting pillow. The rubber backing may have greater stiffness than the membrane of the contacting pillow, but may still be non-rigid so that it can bend to allow the pillow to wrap around an object. In additional examples, the gripper may further include a metal mounting plate in addition to or instead of the rubber backing. In some examples, the metal plate may provide a rigid mounting point to attach the gripper to a robotic manipulator which may use the gripper to pick up and/or move objects.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

According to various embodiments, described herein are methods and systems for automated loading and/or unloading of boxes and/or other objects, such as into a storage container or from a vehicle. In some example embodiments, boxes or objects may be automatically organized and placed onto pallets. Within examples, automating the process of loading/unloading trucks and/or the process of creating pallets from objects for easier storage and transport may provide a number of industrial and business advantages.

According to various embodiments, automating the process of loading/unloading trucks and/or the process of creating pallets may include the incorporation of one or more robotic devices to move objects or perform other functions. In some embodiments, a robotic device can be made mobile by coupling with a wheeled base, a holonomic base (e.g., a base that can move in any direction), or rails on the ceiling, walls or floors. In some embodiments, the base can be an elevated base.

In some examples, a system including one or more sensors, one or more computers, and one or more robotic arms is described. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

As used herein, the term "boxes" will refer to any object or item that can be placed onto a pallet or loaded onto or unloaded from a truck or container. For example, in addition to rectangular solids, "boxes" can refer to cans, drums, tires or any other "simple" shaped geometric items. Additionally, "loading" and "unloading" can each be used to imply the other. For example, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Of course, examples herein may be applied toward objects other than boxes as well, and toward objects of various sizes and shapes.

According to various embodiments, a robotic manipulator may be mounted on a holonomic cart (e.g., a cart with wheels that allow the cart to move in any direction). FIG. 1A depicts an exemplary holonomic cart containing a robotic manipulator. In some embodiments, a moveable cart 112 may include a robotic arm 102 mounted on the cart 112. The robotic arm 102 may contain a gripping component 104 for gripping objects within the environment. The cart may contain one or more wheels 114, which may be holonomic wheels that operate with two degrees of freedom. In further embodiments, a wrap around front conveyor belt 110 may be included on the holonomic cart 112. In some examples, the wrap around front conveyer belt may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In other example embodiments, one or more robotic manipulators may be mounted on rails of a truck or container. In such examples, the robotic manipulators may be used to load or unload the truck or container.

FIG. 1B is a functional block diagram illustrating a robotic device 100, according to an example embodiment. The robotic device 100 could include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described functions of the robotic device 100 may be divided up into additional functional or physical components, or combined into fewer functional or physical components. In some further examples, additional functional and/or physical components may be added to the examples illustrated by FIGS. 1A and 1B.

The mechanical system 120 may include components described above with respect to FIG. 1A, including a robotic arm 102, a gripper 104, a conveyer belt 110, a (movable or holonomic) cart 112, and one or more wheels 114. The mechanical system 120 may additionally include a motor 122, which may be an electric motor powered by electrical power, or may be powered by a number of different energy sources, such as a gas-based fuel or solar power. Additionally, motor 122 may be configured to receive power from power supply 150. The power supply 150 may provide power to various components of robotic device 100 and could represent, for example, a rechargeable lithium-ion or lead-acid battery. In an example embodiment, one or more banks of such batteries could be configured to provide electrical power. Other power supply materials and types are also possible.

The sensing system 130 may use one or more sensors attached to a robotic arm 102, such as sensor 106 and sensor 108, which may be 2D sensors and/or 3D depth sensors that sense information about the environment as the robotic arm 102 moves. The sensing system may determine information about the environment that can be used by control system 140 (e.g., a computer running motion planning software) to pick and move boxes efficiently. The control system 140 could be located on the device or could be in remote communication with the device. In further examples, scans from one or more 2D or 3D sensors with fixed mounts on a mobile base, such as a front navigation sensor 116 and a rear navigation sensor 118, and one or more sensors mounted on a robotic arm, such as sensor 106 and sensor 108, may be integrated to build up a digital model of the environment, including the sides, floor, ceiling, and/or front wall of a truck or other container. Using this information, the control system 140 may cause the mobile base to navigate into a position for unloading or loading.

In additional examples, planar surface information may be extracted from 3D sensors to model walls, floor and/or box faces. After modeling the floor, projection of objects onto the floor plane may enable segmentation of obstacles and/or target objects such as boxes. Floor-plane projection can also be used to model the corrugated sides of a container or truck, which may not be accurately modeled as planes. In further examples, sidewall angles, floor plane roll and pitch, and/or distance from side walls can be used to maneuver a mobile base into a container without collisions. Use of extended 3D information rather than a single line scan may help make the extraction of navigation information robust. For example, the side walls may have a vertical extent that is captured by the 3D sensor. Scanning systems that use a single line of depth information may be slower if they scan vertically and/or less robust because they acquire less information. In additional examples, front plane modeling can determine the distance to a next group of objects to pick in truck unloading.

In further examples, the robotic arm 102 may be equipped with a gripper 104, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

In some embodiments, the gripper could potentially span several boxes or objects and turn on suction for some or all of the covered objects. In some embodiments, the suction or adhesion devices may be a "digital" grid so that the robotic device can turn on any number of the suction devices as will fit boxes sensed for grabbing. In some implementations, the system may notice a seam in the boxes (separation between adjacent boxes) such that suckers can be activated on both sides of the seam to pick up both boxes at once, thereby doubling the throughput. In some embodiments, the suckers can sense after a certain amount time whether they can successfully grip a surface, after which they may automatically shut off. In further embodiments, sections of the suckers can fold down to grasp the top of the boxes. For instance, grippers can initially start at full extension and then conform to the surface being gripped.

In further examples, the robotic arm can implement a wiggle movement to improve a suction grip. In additional embodiments, the robotic arm can wiggle a box side to side to help segment the box from its surroundings. In other embodiments, the arm can wiggle upon pick up of the box to avoid jostling other objects. In such embodiments, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air.

According to various embodiments, cardboard boxes can have concave, convex or otherwise rumpled faces that make it hard for a suction device to adhere to. Thus, wiggling the suction device as the device makes suction contact may enable a more reliable grip on cardboard boxes and other non-planar objects. In further examples, when first grabbing a box, a few center suction devices can be turned on and the arm can wiggle back and forth as it starts to pull the box out. This may break surface adhesion with other boxes and help to start to pull the box out. Once the box is at least partially pulled out, the box may then be segmented from the other boxes more easily. In some embodiments, wiggling while picking up an object in clutter may remove other objects from the picked up object, thereby preventing unwanted pick up of surrounding objects.

According to various embodiments, segmentation of items may be necessary for successful grasping. In some embodiments, a smooth surface patch may belong to two separate objects. In such instances, manipulator interaction with the objects may be used to perturb the scene to better segment the objects from each other. For motion separation, the natural or forced movement of objects on a conveyor, on a slide, moving in a tote, and/or actively jostled within a tote may be tracked by optical flow, parallax, or time delayed views to calculate stereo depth in order to enhance object segmentation.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various embodiments, cues such as barcodes, texture coherence, color, 3D surface properties, or printed text on the surface may also be used to identify an object and/or find its pose in order to know where and/or how to place the object (e.g., fitting the object into a fixture receptacle). In some embodiments, shadow or texture differences may be employed to segment objects as well.

Many or all of the functions of robotic device 100 could be controlled by control system 140. Control system 140 may include at least one processor 142 (which could include at least one microprocessor) that executes instructions 144 stored in a non-transitory computer readable medium, such as the memory 146. The control system 140 may also represent a plurality of computing devices that may serve to control individual components or subsystems of the robotic device 100 in a distributed fashion.

In some embodiments, memory 146 may contain instructions 144 (e.g., program logic) executable by the processor 142 to execute various functions of robotic device 100, including those described above in connection with FIGS. 1A-1B. Memory 146 may contain additional instructions as well, including instructions to transmit data to, receive data from, interact with, and/or control one or more of the mechanical system 120, the sensor system 130, and/or the control system 140.

Figure 2A:
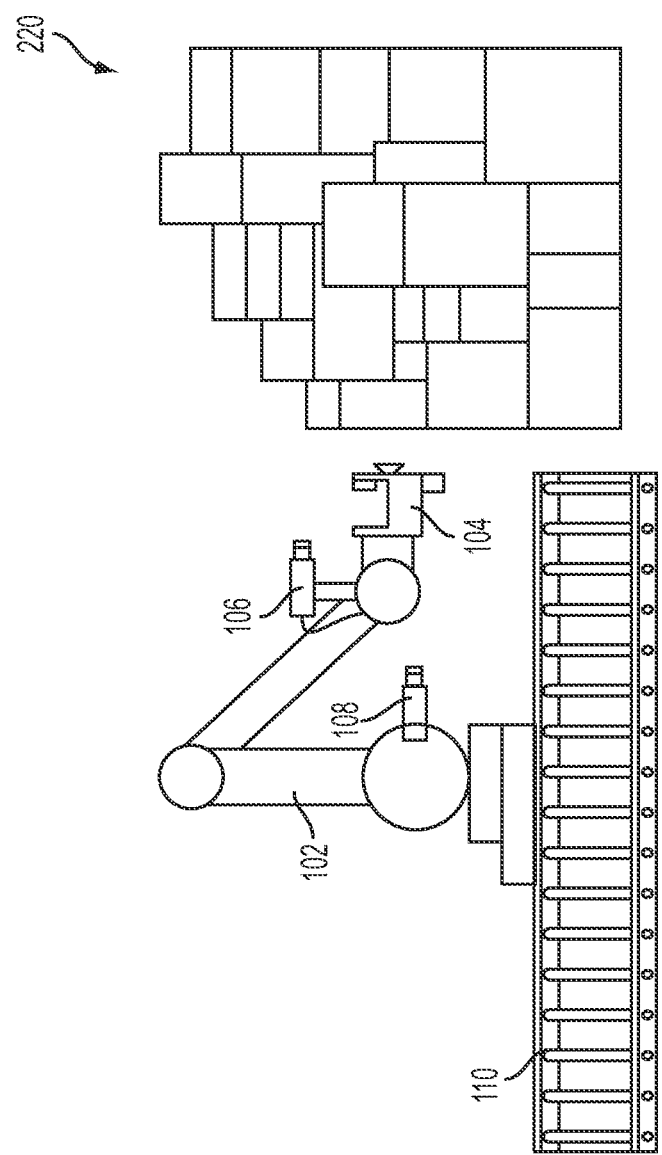
FIG. 2A shows a robotic arm and a stack of boxes, according to an example embodiment.

According to various embodiments, a perception-guided robot is described. For instance, a robotic device may utilize a combination of perception together with planning to guide the robot arm to pick up a box and place it where it needs to go. FIG. 2A illustrates part of the robotic device from FIG. 1A with a stack of boxes, according to an example embodiment. As shown, the robotic device may include a robotic arm 102 with a gripping component 104, sensors 106 and 108, and conveyer 110 as described above. In some examples, the robotic device could be mounted on a holonomic cart as described with respect to FIG. 1A, could be mounted on a different type of movable apparatus, could be mounted on rails or tracks, or could be stationary. The robotic device may be controlled to pick boxes from a stack of boxes 220 containing a heterogenous mix of shapes and sizes of boxes.

Figure 2B:
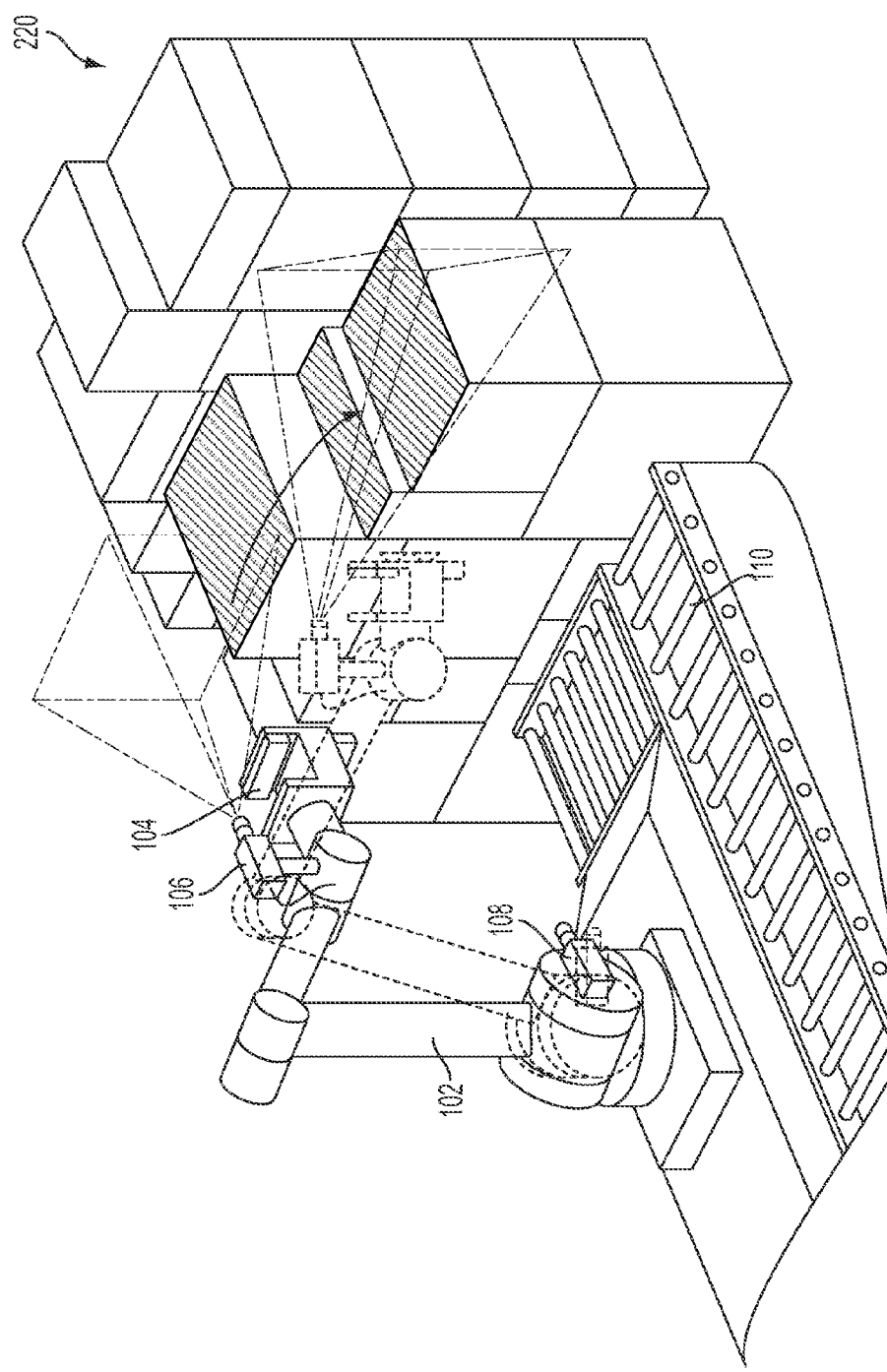
FIG. 2B shows scanning of the stack of boxes from FIG. 2A by a sensor mounted on the robotic arm, according to an example embodiment.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 2B. As the robotic arm 102 moves, a sensor 106 on the arm may capture sensor data about the stack of boxes 220 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various embodiments, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking keypoints in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment. Such techniques may also increase the level of detail captured, which may help the robotic device perform various tasks. In particular, integrating information can yield finer detail than from a single scan alone (e.g., by bringing down noise levels). This may make possible better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect where objects of interest are. Also, mathematical representations of objects may be used to look for anomalies such as when person enters into an environment. Such events may violate the ideal model, which may make their detection easier.

In other examples, certain objects such as boxes may have simple planar form. For instance, a metal can may have a geometric form of a cylinder and a tire may have a geometric form of a torus. Example systems may leverage this trait of certain objects in order model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map of distances as the third dimension). Examples of facades may include the wall of boxes in a truck, the top of a pallet stack containing boxes or other objects, or the top of a bin of jumbled objects.

Figure 2C:
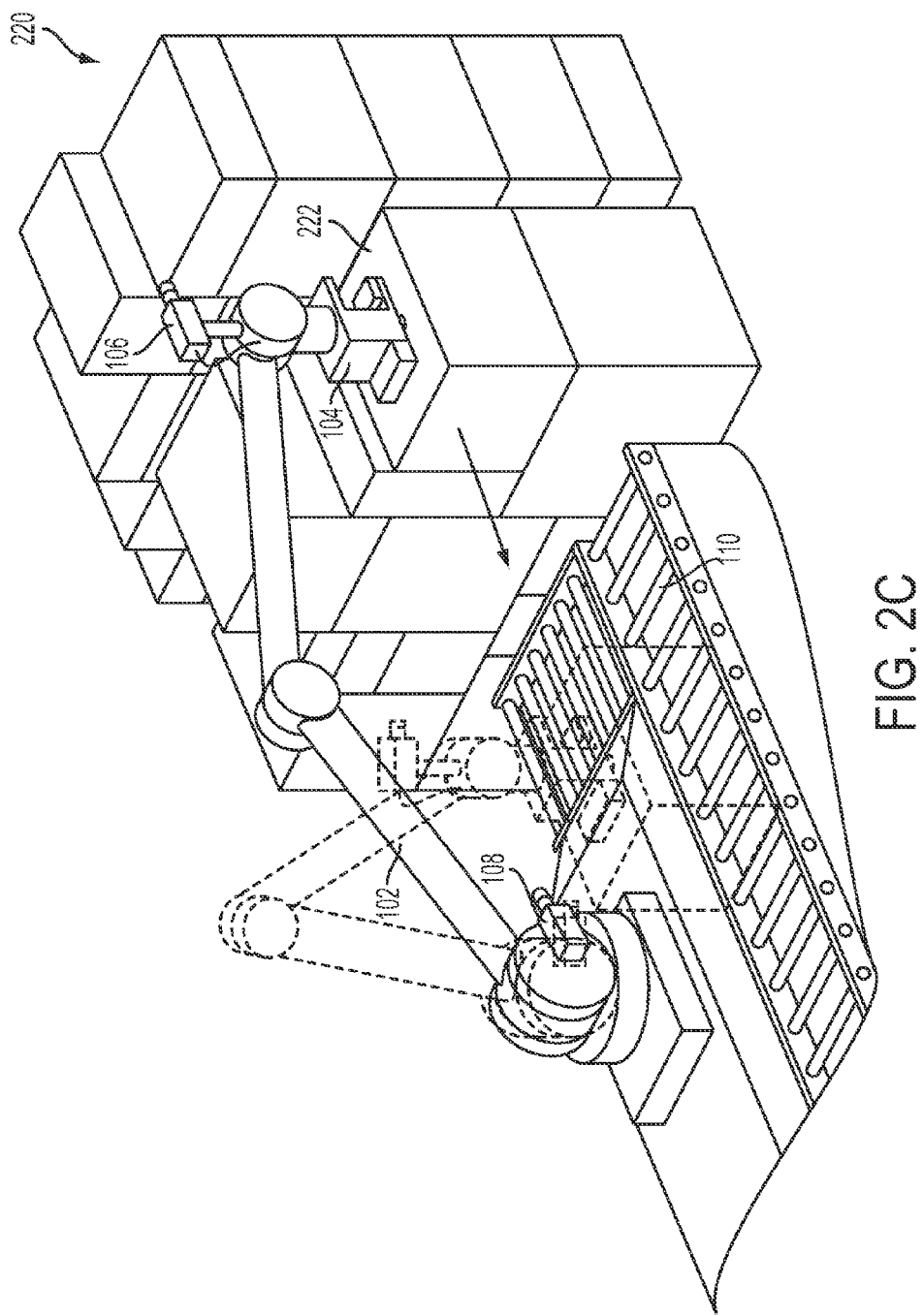
FIG. 2C shows the robotic arm from FIG. 2A moving a box, according to an example embodiment.

In further examples, a facade may be constructed from boxes, for instance to plan in what order the boxes should be picked up. For instance, as shown in FIG. 2C, box 222 may be identified by the robotic device as the next box to pick up. Box 222 may be identified within a facade representing a front wall of the stack of boxes 220 constructed based on sensor data collected by one or more sensors, such as sensor 106 and 108. A control system may then determine that box 222 is the next box to pick, possibly based on its shape and size, its position on top of the stack of boxes 220, and/or based on characteristics of a target container or location for the boxes. The robotic arm 102 may then be controlled to pick up the box 222 using gripper 104 and place the box 222 onto the conveyer belt 110 (e.g., to transport box 222 into a storage area).

In additional examples, a facade may be represented as an orthographic projection of 3D surface information. This representation may allow for parsing the facade to determine interesting areas for a particular application. For example, in truck unloading, the upper left corner of the next box to pick may be determined based on a facade representation. In other examples, an orthographic projection of integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a cart base or fixed locations may be combine to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking. Constant or frequent updating of the environment may allow the robot arm to quickly respond to changes. In further examples, an optimizer may perform frequent continuous collision checking throughout its path. An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some embodiments, path constraints, such as collision avoidance for robotic arms, cameras, cables, and/or other components, may be put in a constraint based planning solver and solved for to yield a best path to move the arm for perception. Additionally, in some embodiments, the solver may determine a best path for picking up, moving, and placing an object.

According to various embodiments, 3D and/or visual sensors may be calibrated to determine their pose with respect to the workspace. In the case of fixed sensors, the calibration may determine their fixed pose in the workspace. In the case of a sensor on the arm, calibration may determine the offset pose of the sensor from the arm link to which it is attached.

Within examples, calibration techniques may allow for the calibration of an arbitrary number of sensors in the workspace. Calibration may involve determining some or all of a variety of parameters and coefficients. For example, calibration may solve for one or more intrinsic parameters such as focal length and image center. As another example, calibration may determine one or more distortion coefficients such as models of radial and tangential distortion. As yet another example, calibration may solve for one or more extrinsic parameters, where the object is in a scene relative to a pattern or other sensors that identified the same pattern in a scene.

In some examples, calibration may be performed at least in part by using a calibration pattern, which may be a known set of features in 2D or 3D. For instance, a known pattern of dots may be used, where the distance between each dot and the other dots is known. Calibration may be performed at least in part by collecting multiple different views of an object. In further examples, capturing multiple views of a calibration pattern in different positions may allow for (1) calibration of the one or more coefficients of the camera and/or (2) knowledge of where the camera is relative to the coordinate system established by where the calibration pattern was fixed. In particular embodiments, a camera in the scene may identify a calibration pattern on the robot arm while a camera on the arm identifies a calibration pattern in the scene simultaneously.

In additional examples, calibration may involve a camera fixed in a scene. In this case, a calibration pattern may be placed on a robotic arm. The robotic arm may be configured to move through the scene as multiple views of the calibration pattern on the robotic arm are collected. This may help to calibrate the camera and/or be useful for relating the coordinate system of the camera to that of the robot. Further, the relation of each device to the other can be determined by each device as the robotic arm moves.

In certain examples, calibration may involve a camera located on a robotic arm. A calibration pattern may be mounted on a wall or table. Then, the camera may be moved around, collecting multiple views of the calibration pattern from different robot or robotic arm positions. When different 3D or 2D views (e.g., 2, 20, 200) are collected, these views can be used to solve for the calibration relationships. After calibration, when the camera on the arm moves, the system can determine where it is relative to the coordinate system set based on the location of the calibration pattern in the scene. In particular embodiments, both the calibration pattern and the camera may be movable. For example, the calibration pattern may be located on a conveyor belt where the robotic arm may be configured to place boxes. After calibration, the system may determine where the camera was relative to that spot on the conveyor belt.

In further examples, nonlinear optimization may be performed in a two-stage process for robust estimation of 3D sensor calibration. In one stage, an initialization may be derived from the relative pose offsets of the target and the sensors. In another stage, given the initialization, a batch bundle adjustment may be used to find the optimal pose of the cameras together with the target points. Calibration can be extended to the estimation of robot parameters such as joint lengths and joint angle offsets.

In other examples, known, precise, robot motion of the camera over a calibration pattern, or a calibration pattern over a camera may be used to improve calibration results. For instance, information about precisely how the camera moves may be used to obtain more accurate camera calibration. That is, if the camera is moved 50 mm right, the corresponding (perspective projection) amount of movement from the calibration object may be detected. This information may be used to jointly or separately optimize the calibration and tracking parameters.

In additional examples, a robot can look at its ongoing calibration and move in such a way as to maximize information for better calibration. For example, it can detect that some view areas have not been seen and go to those views.

In further examples, a system for the practical manipulation of heterogeneous, categorical items, generally from a cluttered collection area to a defined bin, is presented. In some embodiments, the pick location containing the items may not be sensitive to precise object orientation(s) and items may be mixed together. In additional examples, the place location for the items may or may not be sensitive to object orientation. In some examples, the pick-and-place regions may be defined as 3D regions acceptable for picking or placing an object, with some tolerance. The pick-and-place region may be highly cluttered with similar and/or disparate objects. In other embodiments, the items may come from or be put into a fixture, such as metal or plastic snaps that hold the sorted item in a particular orientation.

In additional examples, environment modeling of both the pick-and-place location may be used for intelligent grasp location and motion, as well as event reporting (e.g., when a place region is full or a pick region is empty). In some examples, object bounding volumes may be computed and/or distinguishing features of objects may be found (such as textures, colors, barcodes or OCR). In some embodiments, objects may be sorted into an assigned destination location by matching against a database of location assignments indexed by object type or object ID. For instance, an object's locations may be derived from reading a barcode, considering the size of the object, and/or by recognizing a particular kind of object.

In some examples, a plan for a robotic device may be determined in order to achieve certain configurations of the objects within a target location for the objects. For instance, the goals for loading/unloading or constructing/deconstructing pallets may be to achieve: 1) a dense packing with minimal air gaps in between boxes, and/or 2) a stable packing that won't easily collapse. In some embodiments, stability may require that, in general, heavy objects are on the bottom, and light objects are on top. In other examples, pallets may be created in order to avoid non-interlaced column stacks, column leans, or other characteristics of a bad stack.

In further examples, the pallet or truck/container may be loaded such that work by human operators in subsequent unloading processes is minimized. For instance, in some embodiments, items may be placed in last in, first out order such that, upon unpacking, the items needed first are on top, the items needed second are one layer down and so on. In other examples, the loading of pallets may be independent of how items flow towards the packing cells. Thus, according to some embodiments, the system can handle packages sent in random order or in an order known in advance. In addition, in some embodiments, systems may adapt to changes in the flow of items on the fly. In further examples, one or more boxes may be recorded and buffered by holding the boxes in a temporary storage area where their order can be changed along the way.

According to various embodiments, a 2D simulator and/or a 3D simulator may be utilized for truck or container loading/unloading or for pallet loading/unloading. In some examples, the state of a stack of boxes may be captured in the physical world and input into the simulator. In some embodiments, a variable size queue of boxes from one to all the boxes may be used by a simulator for finding a next box to pick. For example, a queue of 2 boxes or 4 boxes or 10 boxes may be considered by a simulator.

In further examples, the simulator may search over the boxes in the queue to find the best box placement by heuristic algorithms and/or by brute force or multi-resolution search. In some embodiments, the system may increment with increasingly fine placement of boxes around the best sites found in the previously coarser level. In some embodiments, once placement of particular next box has been determined, a physics planner may be used for motion planning in order to move the box efficiently to the determined locations. In further examples, the physical and simulated stacks may be continuously monitored for quality of the stack (e.g., density, stability, and/or order placement). In some examples, the process may be repeated until all the boxes have been placed or the target container can no longer fit in another box.

Figure 3A:
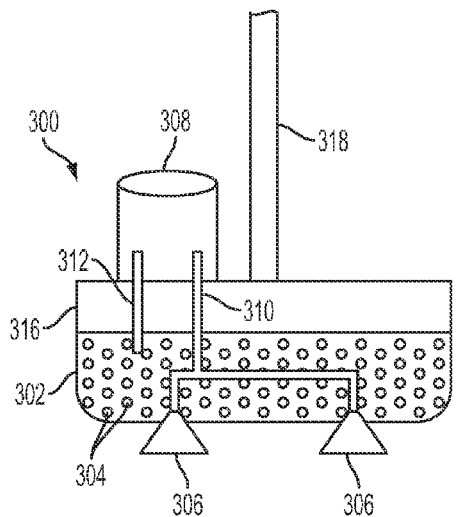
FIG. 3A illustrates a variable stiffness gripper, according to an example embodiment.

FIG. 3A illustrates a suction gripper with a variable stiffness pillow, according to an example embodiment. More specifically, suction gripper 300 may include a compliant pillow 302 with a non-rigid membrane made up of a material capable of stretching, such as latex or rubber. Additionally, the pillow 302 may be filled with small particles 304, such as sand, glass beads, coffee grounds, or other types of granular materials, possibly including composite materials. In other examples, other types of materials displaying the property that the materials become rigid with increasing density may be used as well. In some examples, the pillow 302 may be filled with a certain amount of air in between particles 304, which may allow the particles 304 to move around within the pillow 302. Movement of particles 304 within pillow 302 may allow the pillow 302 to conform to a surface or a shape (e.g., of an object to be picked up) when the pillow 302 is pressed against the surface or shape.

In further examples, suction gripper 300 may additionally include one or more suction cups 306. In some examples, some or all of suction cups 306 may be affixed to the surface of the non-rigid membrane of compliant pillow 302. In additional examples, some or all of the suction cups 306 may be built in to the surface the pillow 302. In further examples, part or all of the individual suction cups 306 may be made up of the same material as the membrane of compliant pillow 302. For instance, both the membrane of pillow 302 and the parts of the suction cups 306 that make up attachment points to the pillow 302 may be made up of a non-rigid plastic.

An example suction cup may have a curved surface (e.g., a circular cup). When the curved surface is pressed against a face of an object, the volume between the curved surface and the face may be reduced, which may in turn expel fluid (e.g., air) in the volume past the rim of the curved surface. The volume may then have a negative pressure relative to the environment, which may create a suction force between the curved surface and the face of the object. This suction force may be created or increased by way of a vacuum system including an air pump that increases the pressure differential between the negative pressure in the volume and the environment.

For instance, suction gripper 300 may include a vacuum system 308 with an air pump that is connected to suction cups 306 via a connection 310 (e.g., a rigid or non-rigid tubing) that allows the vacuum system 308 to apply suction force through suction cups 306. In some examples, the vacuum system 308 may have separate connections to different ones of the suction cups 306 to separately activate certain suction cups or groups of suction cups. In additional examples, a separate mechanism may be used to activate and/or deactivate individual suction cups or groups of suction cups. For instance, individual suction cups may be blocked or sealed off from vacuum system 308 in order to prevent suction from being applied through the individual suction cups.

The vacuum system 308 may additionally include a separate connection 312 (e.g., a separate rigid or non-rigid tubing) to the interior of the pillow 302. The vacuum system 308 may use connection 312 to remove and/or insert air or a different type of fluid from and/or to the interior of pillow 302. By pushing air out of or into the compliant pillow 302, vacuum system 308 may be used to increase or decrease the stiffness of the pillow 302. In some examples, vacuum system 308 may include a single air pump connected to both the interior of the pillow 302 and to suction cups 306. In other examples, vacuum system 308 may include two or more separate air pumps with connections to different components of gripper 300.

Suction gripper 300 may additionally include a backing 316 for pillow 302. In some examples, the backing 316 may provide increased stability for picking up and/or moving objects. In certain examples, the backing 316 may be made up of a rigid material, such as a metal mounting plate. In other examples, the backing 316 may be made up of a semi-rigid or non-rigid material instead. For instance, pillow 302 may include a compliant rubber surface, and backing 316 may be made up of a semi-rigid rubber material that has greater stiffness than the surface of pillow 302, but allows some degree of bending (e.g., to help the pillow conform to an object). Other combinations of materials are also possible.

Suction gripper 300 may also include a linkage 318 in order to connect the suction gripper with another device. For instance, backing 316 may be a rigid, metal mounting plate that allows for a solid connection with a device that may use the gripper, such as a robotic manipulator. In some examples, the linkage 318 may be separately mounted on a robotic manipulator (e.g., on an end effector of a robotic arm). In other examples, the linkage 318 may be built directly into the robotic manipulator instead.

Figure 3B:
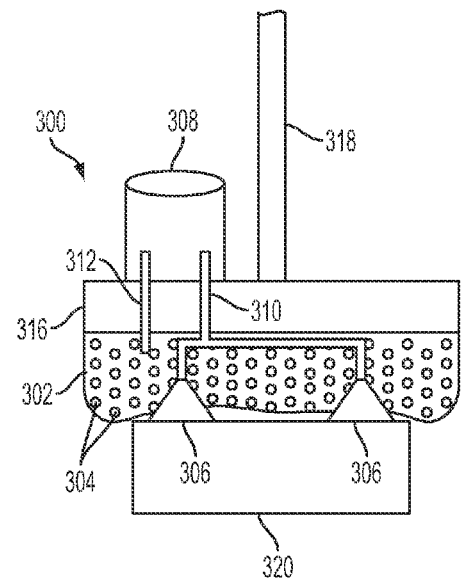
FIG. 3B illustrates the gripper from FIG. 3A with suction cups attached to a box, according to an example embodiment.

FIG. 3B illustrates the gripper from FIG. 3A with suction cups attached to a box, according to an example embodiment. More specifically, suction gripper 300 may be controlled to press the compliant pillow 302 against an object such as box 320. As the pillow 302 is pressed against the box 320, one or more of the suction cups 306 may be pressed against or positioned adjacent to one or more surfaces of the box 320. In some examples, one or more of the suction cups 306 in contact with the box 320 may be activated in order to cause the vacuum system 308 to apply suction through the suction cups 306 to the box 320.

In further examples, some or all of the suction cups 306 may be activated at the same time after a certain number of the suction cups have made contact with the box 320. In other examples, one or more of the suction cups 306 may be activated at different points in time as the suction cups come in contact with the box 320. For instance, individual suction cups may be activated after a control system determines that the individual suction cups are in a position adjacent to a graspable surface of an object. In further examples, positioning of individual suctions cups may be determined or controlled based on optical sensor data from one or more optical sensors as well or instead.

Two suction cups are pictured in FIGS. 3A-3D, but any number of suction cups may be used. In some examples, the suction cups may be arranged in a two-dimensional grid on the surface of the contacting pillow. For instance, a 4×4 grid of 16 suction cups may be positioned on the contacting pillow. In some examples, only a certain subset of the suction cups may be used to grip an object, possibly depending on the object's size or shape. In additional examples, suction cups may be arranged on two or more different surfaces of a single contacting pillow or multiple contacting pillows to provide suction in multiple directions as well.

In further examples, the placement of one or more of the suction cups 306 may be improved by further pressing of the pillow 302 against the box 320. For instance, the suction gripper 300 may additionally include in-line sensors indicative of the vacuum response of individual suction cups or groups of suction cups. If one or more suction cups are activated and then determined to have poor vacuum responses based on data received from the in-line sensors, those suction cups may be deactivated. The pillow 302 may then be further pressed against the box 320 in an effort to improve the connection of the suction cups to the box before reactivating the suction cups.

Figure 3C:
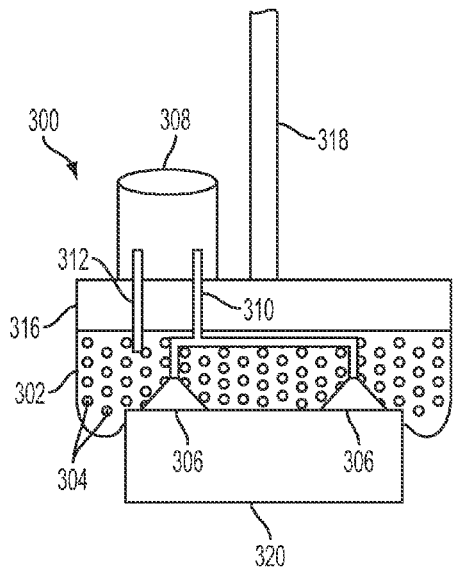
FIG. 3C illustrates the gripper from FIG. 3A with a variable stiffness pillow pressed against a box, according to an example embodiment.

FIG. 3C illustrates the gripper from FIG. 3A with the variable stiffness pillow pressed against the box, according to an example embodiment. More specifically, suction gripper 300 may be controlled to press the contacting pillow 302 against the object 320 in order to cause the pillow 302 to conform to a shape of the object 320. In some examples, the pillow 302 may conform to ridges or other surface irregularities of the object 320 as the pillow 302 is pressed against the object 320. In further examples, the pillow 302 may be pressed against the object 320 until the pillow 302 and the object are touching over a certain amount of surface area, a certain percentage of the surface of the pillow 302, and/or a certain percentage of the surface of the object 320.

Figure 3D:
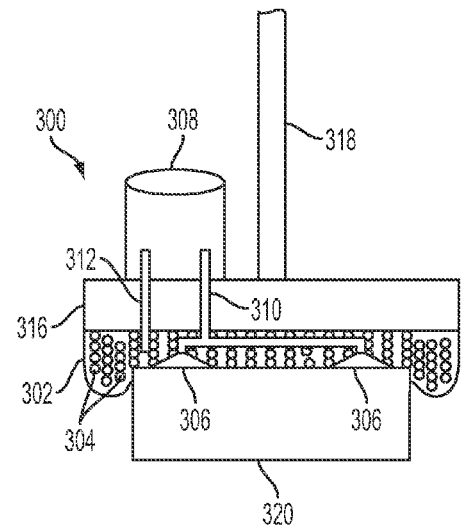
FIG. 3D illustrates the gripper from FIG. 3A after increasing stiffness of the pillow, according to an example embodiment.

FIG. 3D illustrates the gripper from FIG. 3A after increasing stiffness of the pillow, according to an example embodiment. More specifically, the vacuum system 308 may be controlled to remove air or another fluid from between the particles 304 within the contacting pillow 302. As the air is removed, the particles 304 may be jammed together, which may increase the stiffness of the contacting pillow 302. In some examples, different amounts of air may be removed from the contacting pillow 302 to achieve different levels of stiffness. For instance, different levels of stiffness may be used depending on the type or shape of the object 320.

Within examples, a control system may determine when to increase the stiffness of the contacting pillow based on a number of different factors. In some examples, the vacuum system 308 may be controlled to jam the particles 304 together after a certain threshold level of compression between the contacting pillow 302 and the object 320 has been achieved. In other examples, the stiffness of the pillow 302 may be increased after a certain amount of surface area on the object 320 has been covered by the pillow 302.

In further examples, the stiffness of the contacting pillow may be increased after a certain predefined number of suction cups have made contact with an object. In some cases, this threshold number may be determined based on the type or size of the object. For instance, a control system may determine that six suction cups should be sufficient to enable the suction gripper to grip an object. Then the gripper may be controlled to press against the object until at least six suction cups are in contact with the object and can be used to provide suction cup to the object. At that point, the stiffness of the contacting pillow may be increased to provide support for the object and the six suction cups in contact with the object may be activated to grip the object.

In additional examples, the stiffness of the contacting pillow may be increased after one or more of the suction cups have achieved a certain level of gripping force on the object. For instance, as the pillow is pressed against the object, one or more suction cups in contact with the object may be activated. In some examples, an estimate of the gripping force supplied by the suction cups may be estimated. For instance, in-line sensors measuring the vacuum responses of the suction cups may be used to determine an estimate of the total gripping force. In some cases, the stiffness of the contacting pillow may not be increased until a certain threshold level of gripping force has been achieved.

In further examples, the vacuum system 308 may be configured to simultaneously increase the stiffness of the contacting pillow 302 while activating one or more of the suction cups 306. For instance, as the pillow 302 is pressed down on the object 320, the stiffness of the pillow 302 may be slowly increased in a continuous manner or at a number of discrete stages. In some cases, as the stiffness of the pillow 302 is increased, some or all of the suction cups 306 may be activated to apply suction to the object 320. In some cases, better positioning of the suction cups on the object may be achieved by simultaneously increasing stiffness of the pillow 302 while activating one or more of the suction cups 306.

In additional examples, the suction cups 306 may be activated before the stiffness of the pillow 302 is increased. In yet other examples, the stiffness of the pillow 302 may be fully increased before activating some or all of the suction cups 306.

Figure 3E:
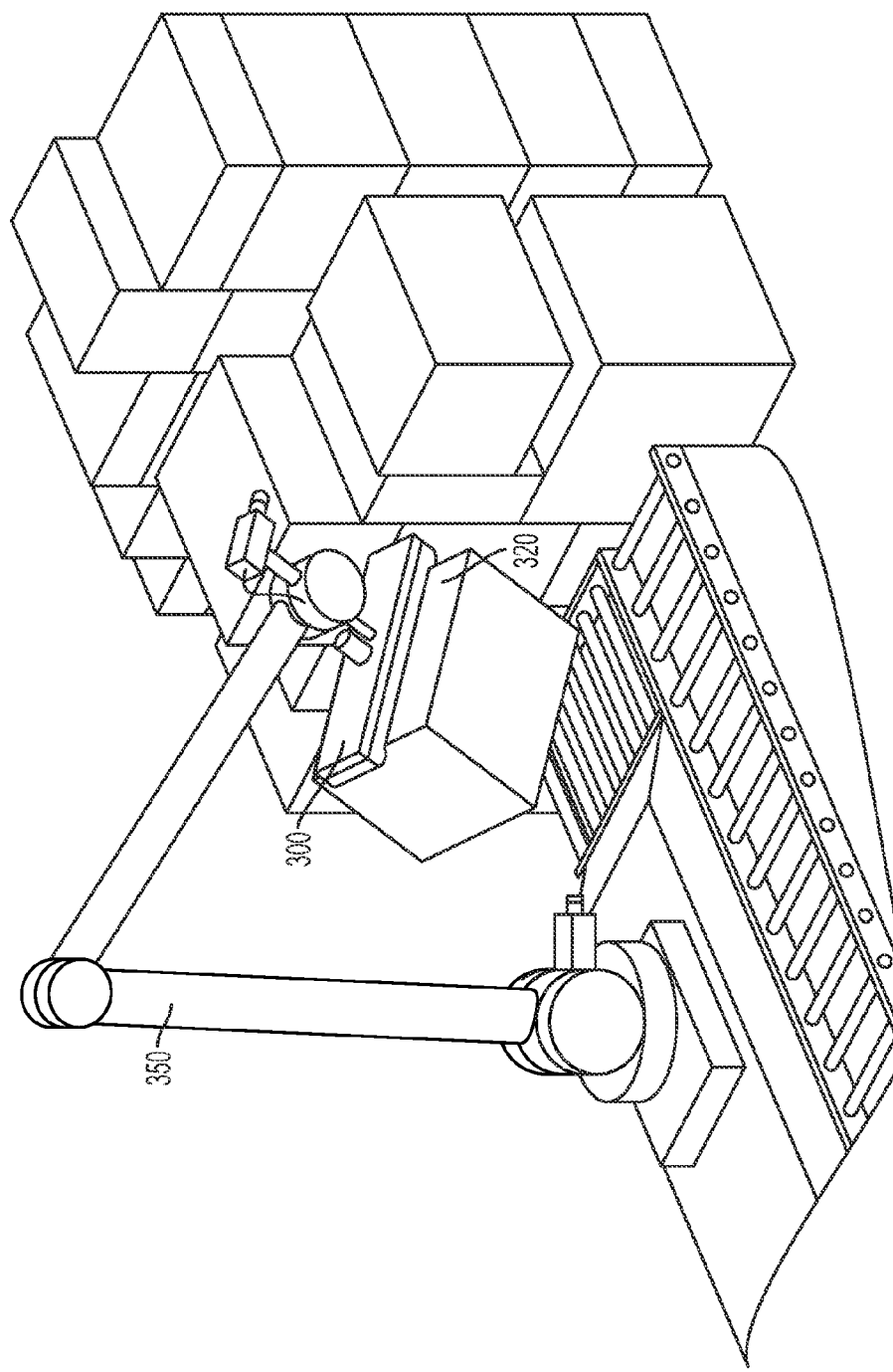
FIG. 3E illustrates a robotic manipulator with a variable stiffness gripper, according to an example embodiment.

FIG. 3E illustrates a robotic manipulator with a variable stiffness gripper, according to an example embodiment. More specifically, suction gripper 300 may be mounted on a robotic arm 350. In some examples, robotic arm 350 may be controlled to pick up box 320 and move it away from a facade of boxes as shown. In particular, the robotic arm may control the suction gripper 300 to push down the contacting pillow onto the box 320. Then, while the suction gripper 300 applies suction to the box 320 through one or more suction cups and after the stiffness of contacting pillow has been increased, the robotic arm 350 may be controlled to move the box 320 through a certain trajectory (e.g., to a dropoff location).

In some examples, the trajectory used by the robotic manipulator 350 to move the box 320 may be determined based in part on an estimate of the suction force applied to the box 320 through one or more suction cups and/or based on the amount of compression and/or surface area contacting between the contacting pillow and the box 320. In some cases, the suction cups may provide the primary holding force for the suction gripper 300 on the object 320 while the contacting pillow provides stability (e.g., to prevent the box from moving around in the air and/or falling from the gripper). In further examples, a trajectory including a path and velocity curve may be determined that is estimated to allow the robotic manipulator 350 to move the box 320 without causing the suction gripper 300 to drop the box 320.

In further examples, the suction gripper may include an actuator that allows the contacting pillow to wrap around corners or edges of objects onto one or more additional surfaces. For instance, such a design may allow the pillow to engage multiple surfaces of an object separated by acute or right angles that may otherwise be difficult to cover.

Figure 4A:
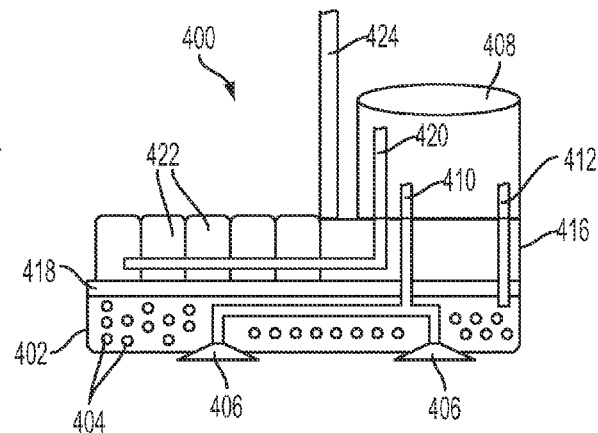
FIG. 4A illustrates a variable stiffness gripper with a pneumatic actuator, according to an example embodiment.

FIG. 4A illustrates a variable stiffness gripper with a pneumatic actuator, according to an example embodiment. More specifically, a suction gripper 400 may include a contacting pillow 402 with a non-rigid membrane that includes one or more suction cups 406. The contacting pillow 402 may include particles 404 that allow the pillow 402 to conform to the shape of an object. The suction gripper 400 may also include a vacuum system 408 that applies suction through suction cups 406 via connection 410 and increases stiffness of the contacting pillow 402 via connection 412. In some examples, the vacuum system 408 may also be used to activate a pneumatic actuator that includes one or more air chambers 422 via a separate connection 420.

The chambers 422 may be made up of a non-rigid material (e.g., rubber) that allows the chambers 422 to expand or shrink. As the vacuum system 408 pushes a fluid (e.g., compressed air) into one or more of the chambers 422 of the pneumatic actuator, one or more of the chambers 422 may then expand. In some examples, the chambers 422 may be constrained so that expansion of one or more of the chambers 420 forces the contacting pillow 402 to curve away from the pneumatic actuator chambers 420. In additional examples, shrinking one or more of the chambers 420 may force the contacting pillow 402 to curve back towards the pneumatic actuator chambers 420.

In further examples, the suction gripper 400 may additionally include a backing 418 for the contacting pillow 402. In some examples, the backing 418 may be made of a semi-rigid material that provides support for the contacting pillow 402 and also allows the pneumatic actuator to bend the backing 418 when air is forced into or out of the chambers 422 of the pneumatic actuator. For instance, both the contacting pillow 402 and the backing 418 may be made from rubber, with the rubber used for the backing having a greater stiffness than the rubber used for the pillow.

In additional examples, the suction gripper 400 may also include a rigid (e.g., metal) mounting plate 416. As shown in FIG. 4A, the contacting pillow 402 and rubber backing 418 may extend beyond the area supported by the mounting plate 416. This design may allow the portion of the contacting pillow 402 not aligned with the mounting plate 416 to bend and wrap around objects. The mounting plate 416 may additionally be connected to a linkage 424 that connects the gripper 400 to a separate device (e.g., to the end effector of a robotic manipulator).

Figure 4B:
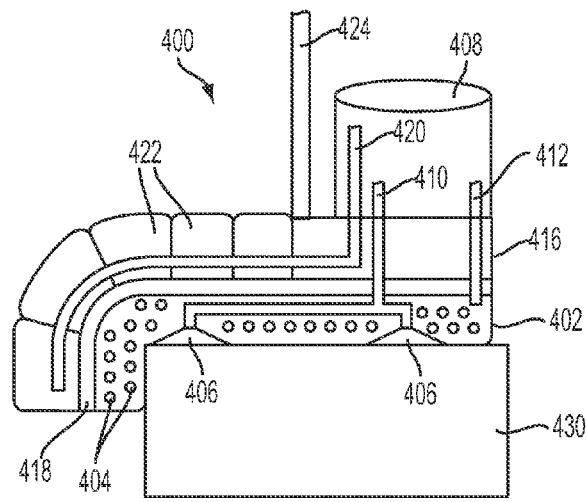
FIG. 4B illustrates the gripper from FIG. 4A with a variable stiffness pillow touching two surfaces of a box, according to an example embodiment.

FIG. 4B illustrates the gripper from FIG. 4A with a variable stiffness pillow touching two surfaces of a box, according to an example embodiment. In particular, an air pump of vacuum system 408 may be used to push compressed air into one or more chambers 422 of the pneumatic actuator. As the chambers 422 expand, the pneumatic actuator may force the contacting pillow 402 and the non-rigid rubber backing 418 to curve around box 430 to contact two surfaces of the box. In some examples, the contacting pillow 402 may provide increased stability for the gripper when the pillow 402 is wrapped around an object before the particles 404 within the pillow 402 are jammed together to make the pillow 402 stiff.

In further examples, a control system may determine when to push air into or remove air from the chambers 422 of the pneumatic actuator based on optical sensor data indicative of a shape of an object. For instance, compressed air may be pushed into the chambers 422 when the control system determines that the pillow 402 needs to be wrapped around an angle that is greater than 180 degrees to conform to the surface of an object. In other examples, the control system may simultaneously determine how to position the gripper 400 to grip the box 430 and how much air to push into or remove from the pneumatic actuator to provide a stable grip of the object.

Figure 4C:
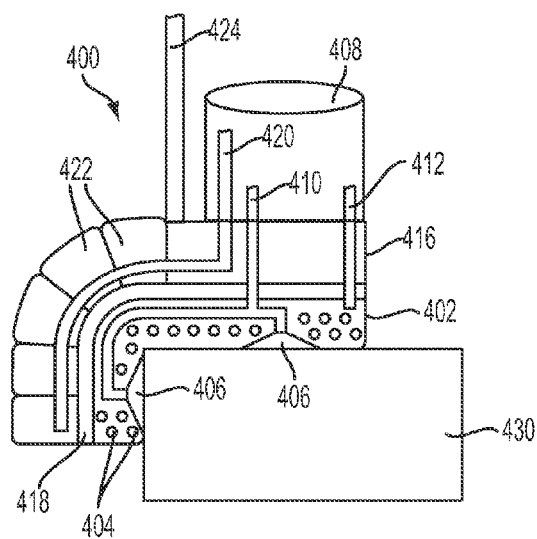
FIG. 4C illustrates the gripper from FIG. 4A with suction cups attached to two surfaces of a box, according to an example embodiment.

In additional examples, the pneumatic actuator may be used to position one or more of the suction cups 406 on different surfaces of an object. For example, FIG. 4C illustrates the gripper 400 with suction cups 406 attached to two surfaces of the box 430, according to an example embodiment. By pushing air into the chambers 422 of the pneumatic actuator, the pillow 402 can be wrapped around the box 430 so that one or more the suction cups 406 are in contacting with a second face of the box 430. This arrangement may allow the suction gripper 400 to apply suction to the box through the suction cups 406 to multiple faces of the box 430 in multiple directions, which may provide increased gripping force.

In other examples, a contacting pillow may contain multiple separate chambers or sections to grip different surfaces of a box. For instance, the contacting pillow may contain a separate tentacle with its own connection to the vacuum system for wrapping around one or more additional surfaces of objects. In further examples, one or more pneumatic actuators may be used to position the multiple separate chambers of the pillow as well.

In additional examples, a different type of actuator may be used to wrap the contacting pillow around an object instead of a pneumatic actuator. For instance, the actuator could instead convert electric current or hydraulic fluid pressure to move the contacting pillow around an object.

Figure 5:
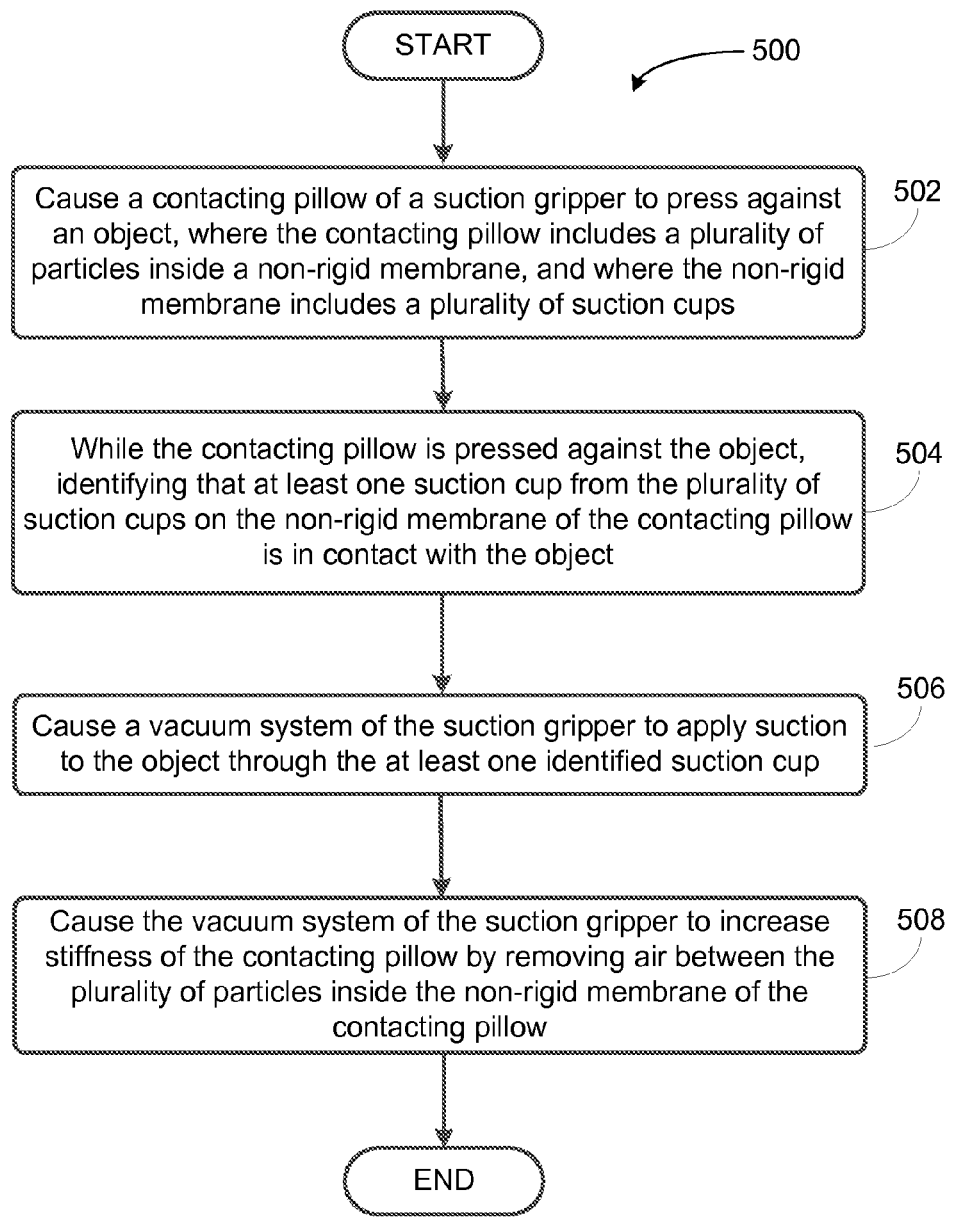
FIG. 5 is a block diagram of a method, according to an example embodiment.

FIG. 5 illustrates a flowchart showing a method 500 that may allow for control of a suction gripper with variable stiffness, according to an example embodiment. Method 500 may be carried out using any robotic device that may be equipped with a suction gripper, such as a device including a robotic arm mounted on a moveable cart, as illustrated and described with respect to FIGS. 1A-1B. In other examples, method 500 may be carried out using a robotic manipulator mounted on a different type of movable apparatus, on a rail or track, or at a stationary location. In further examples, part or all of method 500 may be performed by one or more control systems located within a suction gripper, on a robotic device, and/or in remote communication with a robotic device. Additionally, while examples with an end-effector-mounted suction gripper on a single robotic arm may be described, various alternative embodiments may include other types of robotic manipulators, or may include other automated systems integrated with a robotic manipulator.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 5. Where used, program code can be stored on any type of computer-readable medium, for example, such as a storage device including a disk or hard drive.

In addition, each block of the flowchart shown in FIG. 5 may represent circuitry that is wired to perform the specific logical functions in the process. Unless specifically indicated, functions in the flowchart shown in FIG. 5 may be executed out of order from that shown or discussed, including substantially concurrent execution of separately described functions, or even in reverse order in some examples, depending on the functionality involved, so long as the overall functionality of the described method is maintained.

As shown by block 502 of FIG. 5, method 500 may initially involve causing a contacting pillow of a suction gripper to press against an object. More specifically, the suction gripper may include a pillow with a non-rigid membrane such as rubber that is filled with small particles like glass beads. The gripper may be maneuvered to press the pillow against an object to be picked up by the gripper. In some examples, a position and/or orientation at which to push the pillow against the object may be chosen in an effort to maximize the surface area contact between the pillow and the object. An amount of force with which to press the pillow against the object may also be chosen to maximize surface area contact as well or instead.

The contacting pillow may also include one or more suction cups arranged on or built in to the non-rigid membrane. As the pillow is pressed against the object, one or more of the suction cups may be pushed against one or more surfaces of the object. In some examples, the position and/or orientation of the pillow and/or the amount of force applied to push the pillow against the object may also be chosen in an effort to position certain suction cups against one or more surfaces of the object.

Method 500 may additionally include identifying that one or more suction cups on the non-rigid membrane of the contacting pillow are in contact with the object, as shown by block 504 of FIG. 5. In particular, as the pillow is pressed against the object, certain suction cups may be adjacent to the object and may be used to apply suction to one or more surfaces of the object. In some examples, some or all of the suction cups used to grip an object may be identified in advance based on optical sensor data and/or planned movements of the gripper. In other examples, some or all of the suction cups used to grip an object may be identified after the pillow is pressed against the object based on optical sensor data and/or pressure sensor data indicative of pressure on the surface of the pillow or the suction cups.

Method 500 may further include causing a vacuum system of the suction gripper to apply suction to the object through the at least one identified suction cup, as shown by block 506 of FIG. 5. More specifically, a control system may activate the identified suction cups by causing the vacuum system to apply suction through the identified suction cups. In some examples, all of the suction cups used to grip the object may be activated at the same time. In other examples, different suction cups may be activated at different points in time (e.g., as the suction cups come in contact with a grippable surface of the object).

Method 500 may also include causing the vacuum system of the suction gripper to increase stiffness of the contacting pillow by removing air between the plurality of particles inside the non-rigid membrane of the contacting pillow, as shown by block 508 of FIG. 5. More specifically, the vacuum system may be controlled to pump air out of the contacting pillow to jam the particles inside together to increase the stiffness of the pillow. In some examples, the contacting pillow may be made stiff in order to provide stability to the gripper when picking up or moving the object.

In some examples, the stiffness of the contacting pillow may be increased after one or more suction cups have been identified as being in contact with the object and activated. For instance, the stiffness may be increased after a certain predefined number of suction cups are in contact with the object and can be used to apply suction to the object. In another example, the stiffness of the pillow may be increased after the activated suction cups have achieved a certain amount of gripping force on the object.

In additional examples, the timing for increasing and/or decreasing the stiffness of the contacting pillow may be determined independently of the timing for suction cup activation. For instance, the stiffness of the pillow may be increased after a certain level of compression has been achieved between the contacting pillow and the object. In additional examples, the stiffness of the pillow may be increased after a certain amount of surface area coverage has been achieved between the pillow and the object.

In other examples, the stiffness of the contacting pillow may be increased at the same time as one or more suction cups are activated, or before suction cup activation. Additionally, the stiffness may be also be varied in stages. For instance, the pillow may be pressed against an object and the stiffness of the pillow may then be increased. One or more suction cups in contact with the object may then be identified and activated to grip the object. At a later point, it may be determined that the active suction cups and the placement of the pillow are insufficient to grip and move the object. The stiffness of the pillow may then be decreased (e.g., by pushing air back into the pillow) and the pillow may be pressed against the object again (e.g., to obtain better surface area coverage or to push additional suction cups against the object). Other control algorithms for using any of the types and arrangements of grippers described herein are also possible.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of method 300 described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A suction gripper comprising:
    a contacting pillow comprising a plurality of particles inside a non-rigid membrane that allow the contacting pillow to conform to a shape of an object when the contacting pillow is pressed against the object;
    a plurality of suction cups arranged on the non-rigid membrane of the contacting pillow; and
    a vacuum system coupled to the contacting pillow and to the plurality of suction cups, wherein the vacuum system is configured to:
        apply suction to the object through at least one of the plurality of suction cups that is in contact with the object when the contacting pillow is pressed against the object; and
        increase stiffness of the contacting pillow by removing air between the plurality of particles inside the non-rigid membrane of the contacting pillow.

2. The suction gripper of claim 1, wherein the non-rigid membrane of the contacting pillow comprises a rubber surface.

3. The suction gripper of claim 2, further comprising a rubber backing positioned along a side of the rubber surface of the contacting pillow opposite the plurality of suction cups, wherein the rubber backing has a greater stiffness than the rubber surface of the contacting pillow.

4. The suction gripper of claim 1, further comprising a metal mounting plate positioned along a side of the non-rigid membrane of the contacting pillow opposite the plurality of suction cups.

5. The suction gripper of claim 1, wherein the contacting pillow contacts a first face of the object and the suction gripper further comprises an actuator that enables a portion of the contacting pillow to extend to an additional face of the object.

6. The suction gripper of claim 5, wherein at least one of the plurality of suction cups is arranged on the portion of the contacting pillow that extends to the additional face of the object to apply suction to the additional face of the object.

7. The suction gripper of claim 5, wherein the actuator comprises a pneumatic actuator that causes the portion of the contacting pillow to extend to the additional face of the object when the pneumatic actuator receives compressed air from the vacuum system.

8. The suction gripper of claim 7, wherein the pneumatic actuator comprises a plurality of non-rigid chambers that expand when the pneumatic actuator receives the compressed air from the vacuum system.

9. The suction gripper of claim 1, wherein the vacuum system is configured to apply the suction to the object and increase the stiffness of the contacting pillow simultaneously.

10. The suction gripper of claim 1, further comprising a control system, wherein the control system is configured to:
    determine that a threshold level of contact between the contacting pillow and the object has been achieved; and
    responsively cause the vacuum system to increase the stiffness of the contacting pillow.

11. The suction gripper of claim 1, further comprising a control system, wherein the control system is configured to:
    determine that a threshold level of suction force has been achieved by the at least one of the plurality of suction cups on the object; and
    responsively cause the vacuum system to increase the stiffness of the contacting pillow.

12. The suction gripper of claim 1, further comprising a control system, wherein the control system is configured to:
    determine that a predefined number of the plurality of suction cups on the non-rigid membrane of the contacting pillow are in contact with the object; and
    responsively cause the vacuum system to increase the stiffness of the contacting pillow.

13. A method of gripping an object comprising:
    causing a contacting pillow of a suction gripper to press against the object, wherein the contacting pillow comprises a plurality of particles inside a non-rigid membrane, and wherein the non-rigid membrane comprises a plurality of suction cups;

while the contacting pillow is pressed against the object, identifying that at least one suction cup from the plurality of suction cups on the non-rigid membrane of the contacting pillow is in contact with the object;

causing a vacuum system of the suction gripper to apply suction to the object through the at least one identified suction cup; and causing the vacuum system of the suction gripper to increase stiffness of the contacting pillow by removing air between the plurality of particles inside the non-rigid membrane of the contacting pillow.

14. The method of claim 13, further comprising:

determining that a threshold level of contact between the contacting pillow and the object has been achieved; and responsively causing the vacuum system of the suction gripper to increase the stiffness of the contacting pillow.

15. The method of claim 13, further comprising:

determining that a threshold level of suction force has been achieved by the at least one identified suction cup on the object; and responsively causing the vacuum system of the suction gripper to increase the stiffness of the contacting pillow.

16. The method of claim 13, further comprising:

determining that a predefined number of the plurality of suction cups on the non-rigid membrane of the contacting pillow are in contact with the object; and responsively causing the vacuum system of the suction gripper to increase the stiffness of the contacting pillow.

17. The method of claim 13, further comprising:

causing an actuator of the suction gripper to extend a portion of the contacting pillow to an additional face of the object.

18. A gripping system comprising:

a robotic manipulator;

a suction gripper coupled to the robotic manipulator, wherein the suction gripper comprises:

a contacting pillow, comprising a plurality of particles inside a non-rigid membrane;

a plurality of suction cups arranged on the non-rigid membrane of the contacting pillow; and a vacuum system coupled to the contacting pillow and to the plurality of suction cups;

at least one processor; and data storage comprising instructions executable by the at least one processor to cause the system to perform functions comprising:

causing the robotic manipulator to press the contacting pillow of the suction gripper against an object;

while the contacting pillow is pressed against the object, identifying that at least one of the plurality of suction cups on the non-rigid membrane of the contacting pillow is in contact with the object;

causing the vacuum system of the suction gripper to apply suction to the object through the at least one identified suction cup; and causing the vacuum system of the suction gripper to increase stiffness of the contacting pillow by removing air between the plurality of particles inside the non-rigid membrane of the contacting pillow.

19. The system of claim 18, wherein the functions further comprise:

determining that a threshold level of suction force has been achieved by the at least one identified suction cup on the object; and responsively causing the vacuum system of the suction gripper to increase the stiffness of the contacting pillow.

20. The system of claim 18, wherein the functions further comprise:

determining a trajectory to move the object based at least in part on (i) an amount of suction force of the at least one identified suction cup on the object and (ii) an amount of contact between the contacting pillow and the object; and causing the robotic manipulator to move the object through the determined trajectory.

* * * * *